United States Patent [19]

Bagley et al.

[11] 4,193,100
[45] Mar. 11, 1980

[54] CONTROL CIRCUIT

[75] Inventors: James S. Bagley, Littleton; Gary J. Van Norden, Denver, both of Colo.

[73] Assignee: Honeywell Inc., Minneapolis, Minn.

[21] Appl. No.: 948,255

[22] Filed: Oct. 3, 1978

[51] Int. Cl.$^2$ .................................. G11B 15/46
[52] U.S. Cl. ............................................ 360/73
[58] Field of Search ............................. 360/73

[56] References Cited

U.S. PATENT DOCUMENTS

| | | | |
|---|---|---|---|
| 3,350,511 | 10/1967 | Johnson | 360/73 |
| 3,596,007 | 7/1971 | Price et al. | 360/73 |
| 3,702,382 | 11/1972 | Breikss | 360/73 |
| 3,736,565 | 5/1973 | Sidline | 340/172.5 |
| 3,843,914 | 10/1974 | Carlson et al. | 318/327 |
| 3,984,868 | 10/1976 | Ragle et al. | 360/73 |
| 3,990,108 | 11/1976 | Suga et al. | 360/73 |

*Primary Examiner*—Robert S. Tupper
*Attorney, Agent, or Firm*—Laurence J. Marhoefer; Lockwood D. Burton

[57] ABSTRACT

A signal conditioning circuit for a servo signal derived from a magnetic record tape includes a frequency selective signal normalizing circuit which normalizes the reproduced signal to a predetermined value irrespective of the frequency of the input signal. The selective operation of the normalizing circuit is programmed in accordance with a digital code signal representative of the selected speed of operation. A frequency selective filter circuit is also programmed in accordance with digital code representative of the selected speed of operation.

12 Claims, 4 Drawing Figures

CONTROL CIRCUIT

BACKGROUND OF THE INVENTION

The present invention relates to a control circuit. More particularly, it relates to a servo control circuit for controlling the tape drive of a magnetic tape recorder reproduced system.

In the art of magnetic recording, it is important that the speed at which the tape is driven both in recording and in playback be held to a constant value. It is also important, under many conditions, that the speed at which the tape is driven in the playback, or reproduce, mode be the same speed at which it was driven during the recording mode. One technique for accomplishing the latter desideratum is to record a control signal on the tape during the recording process which is to be used in controlling the velocity of the tape during playback. It is, of course, recognized that such machines must be sufficiently flexible to be operated at any one of a number of different selected speeds. Thus such machines may be operated at speeds ranging from 15/16's of an inch per second to 120 inches per second in eight distinct steps. In the industry, there has been set forth a standard set of different frequency control signals for controlling the tape speed at each of the selected speeds. In systems which have been used heretofore, it was recognized that there is a natural frequency response characteristic curve for magnetic tape heads. Traditionally, in order to accomplish the uniformity of output signal, a substantial amount of complex filtering and characterizing are applied to such curves.

Similarly, in previous apparatus, the effective selection from among the numerous tape speeds has entailed a complex system of switching and selection of control circuits.

SUMMARY OF THE INVENTION

It is, accordingly, an object of the present invention to provide an improved control circuit which obviates the shortcomings of the previous systems.

It is another object of the present invention to provide an improved control system as set forth without needs for flattening the response curve of a magnetic playback system.

It is a further object of the present invention to provide an improved control system as set forth which is characterized in simplicity of operation and selection.

It is a still further object of the present invention to provide an improved signal conditioning circuit for a magnetic tape servo control circuit.

In accomplishing these and other objects, there has been provided, in accordance with the present invention, a signal conditioning amplifier for servo control means for a magnetic record reproducing system wherein a signal recorded on the tape is detected and used to control the velocity of the tape in the reproduction mode. In the control console, a speed selection switch is adjusted to indicate the desired speed at which the tape is to be operated. That switch also produces a three-bit binary code which is used to provide a speed related control signal. The control signal is used to selectively control a signal level normalization circuit, to selectively control the characteristic frequency filters and to selectively effect a pulse width control. The velocity control signal is normalized to a preselected value, filtered for the desired frequency and converted to a square-wave signal of suitable frequency to effect the servo control of the tape drive system. Inasmuch as only selected frequencies of a servo control signal are to be used, the traditional flattening of the frequency response curve is eliminated, substituting therefore the gain normalization of each of the selected frequencies.

BRIEF DESCRIPTION OF THE DRAWINGS

A better understanding of the present invention may be had from the following detailed description when read in the light of the accompanying drawing in which.

DETAILED DESCRIPTION OF THE INVENTION

Figures 1, 2:
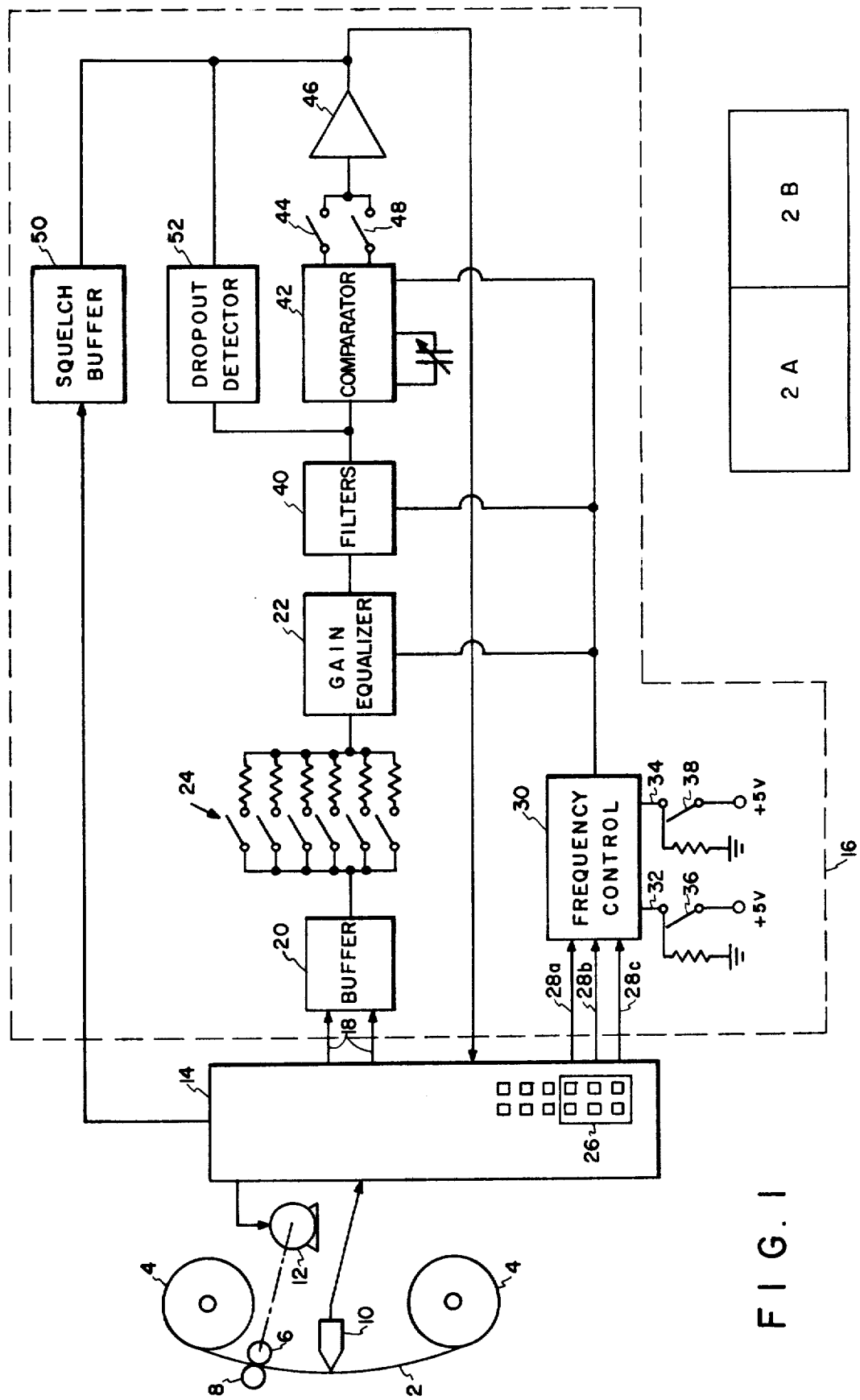
FIG. 1 is a schematic block diagram of a system embodying the present invention.
FIG. 2 is a block diagram showing how the two FIGS. 2A and 2B fit together; the two FIGS. 2A and 2B together are a logic block diagram illustrating the signal conditioning servo control amplifier circuitry constructed in accordance with the present invention.

Referring to the drawings in more detail, there is shown in FIG. 1 a tape record reproducing system in which a magnetic record tape is driven between a pair of tape storage reels 4 by a capstan 6. The tape 2 is held in driving engagement with the capstan 6 by an associated pinch roller 8. The tape 2 is drawn from the reel 4, past a transducer 10 by the capstan 6. The capstan 6 is, in turn, driven at a predetermined speed by a capstan motor 12. The motor is controlled, in part, by speed control signals derived from corresponding signals recorded on the tape.

Although there are many different forms of structure for the mechanisms for the tape recorders, the structure shown in FIG. 1 is rather simplistic in nature and is intended to be merely representative of the various structures.

As hereinbefore mentioned, one technique for controlling the speed at which the tape is driven is by having servo signals prerecorded on the tape at the same time the data information is recorded on the tape. The servo signals will conform to the convention of frequencies representative of the several velocities, in accordance with the established standards. The established standards are, for a tape speed of 120 inches per second, the recorded frequency would be 200 kilohertz; for a tape speed of 60 inches per second, the recorded signal would be 100 kilohertz; for 30 inches per second, the frequency would be 50 kilohertz, and so on. That signal is detected by the transducer 10 and applied to the electronic circuitry in a control console 14.

In accordance with current technology, the electronic circuitry within the console 14 is in the form of printed circuit cards. One such card within the console 14 is a servo signal conditioning circuit 16. The servo signal from the transducer 10 is, after suitable amplification in a preamplifier within the console 14, applied over the two leads 18 to an input buffer amplifier 20. The output of the buffer amplifier 20 is applied to the input of a gain equalizer or normalizing circuit 22.

In the exemplary embodiment of the present invention, the tape recording system may be operated either in a medium band response characteristic or in a wide band response characteristic. In the medium band mode of operation, a set of transducers is used which has a different output characteristic from those transducers used when the apparatus is operated in a wide band mode. Additionally, some recording instruments operate on variations on the standard speed/frequency relationship. Whereas some recording systems operate exactly in accordance with the standard, which is identified herein as 1X or 1 times the standard, other systems will operate at twice the standard frequency which is identified herein as 2X or 2 times the standard. Still other systems operate on the basis of one-half the standard; those are designated herein as X/2 or one-half times the standard frequency.

To accommodate these basic variations in the recorded signal, the input circuit to the gain equalizer 22 includes a plurality of switch numbers, six in number, one of which may be closed, indicative of the mode of operation and the relative standard, each switch being associated with an input resistor appropriate for the selected switch. Inasmuch as the condition or character of the input signal is determined by the user, these switches are manually set. As will be seen more clearly hereinafter, the gain equalizer is essentially in the form of an operational amplifier. The manually set switches 24 control the relative input resistor to the operational amplifier or gain equalizer 22.

The control console 14 also includes a speed select switch 26 which establishes the control conditions within the control console to drive the motor 12 at the selected one of the plurality of speeds. The speed select switch also provides a binary signal on the three output leads 48 indicative of the selected speed. Thus, if there are eight possible different speeds, the three leads are sufficient to carry a binary code uniquely indicative of each of the eight speeds, as shown in Table 1.

| TAPE SPEED | 28a | 28b | 28c |
| --- | --- | --- | --- |
| 120 IPS | 1 | 1 | 1 |
| 60 | 1 | 1 | 0 |
| 30 | 1 | 0 | 1 |
| 15 | 1 | 0 | 0 |
| 7.5 | 0 | 1 | 1 |
| 3.75 | 0 | 1 | 0 |
| 1.87 | 0 | 0 | 1 |
| .937 | 0 | 0 | 0 |

These three leads are connected as input leads to a frequency control module 30. The frequency control module 30 also has a pair of input terminals 32 and 34 connected respectively, through bias resistors to ground and connected respectively through the pair of switches 36 and 38 to a bias voltage source. The frequency control modules 30, as will be seen more clearly hereinafter, is, in effect a binary adder. The switch 36 and 38 represent the standard addend signal. The binary code applied to the three leads, 28a, 28b, 28c, represent the augend. The addend and the augend are combined in the frequency module 30 to produce an output signal which is representative of the selected speed signal modified by the standards variation. To this end, the closure of the switch 36 modifies the speed code signal to produce an output signal which is representative of the 2X mode of operation. Alternatively, with the switch 38 closed, the output signal of the frequency control module 30 is representative of the selected speed code modified in accordance with 1X mode of operation. With both switches open, the output signal from the frequency control module 30 is representative of the speed control signal modified in accordance with X/2 mode of operation.

The signals from the frequency control module 30 are applied, first, to the gain equalizer 22. As will be seen more clearly hereinafter, the output signals from the frequency control module 30, in fact, control the feedback circuits around the operational amplifier whereby to control the gain of the amplifier such that the output signal is normalized to substantially one volt RMS, irrespective of the speed or mode of operation. That one volt signal is applied to the input of a selected filter network 40, the selectively of which is also controlled by the output of the module 30.

The output of the filter network 40 is applied as input signal to a comparator/pulse former 42. The signal input to the comparator 42 is substantially a sine wave of a frequency determined by the frequency recorded on the tape. The comparator 43 produces a series of output square wave pulses which may be of the same frequency as the input signals, or, selectively, of a frequency twice that of the input signal. The comparator 42 also responds to the signal output from the frequency control module 30 to effect the control of the pulse with the generated pulses to produce pulses having a 50% duty cycle at whatever frequency is selected for the input. Again, as will be seen more clearly hereinafter, the output from the comparator 42 may be taken from either of two output terminals. One such output terminal is connected through a switch 44 to the input of an output buffer amplifier 46. The output from that output terminal is a pulse signal of frequency matching the frequency of the input signal to the comparator 42. The other output terminal is connected through a switch 48 to the input of the output buffer 46. The output signal from that terminal is of a frequency double the frequency of the input signal. The output signal from the buffer amplifier 46 is returned to the servo control circuitry in the control module 14 whereby to control the operation of the capstan drive motor 12.

It will be appreciated that, within the control console 14, the operation of the speed selection switches 26 produce a locally generated reference signal for the control of the servo circuitry. When operation of the tape drive mechanism is initiated, the control console produces a "squelch" signal which is applied through a squelch buffer 50 to inhibit the output of the buffer amplifier 46 until such time as the tape is up to speed and the reproduced control signal is substantially equal to the desired frequency.

Similarly, if, for some reason, the signal reproduced from the tape is missing or too weak for reliable operation, the output of the buffer amplifier 46 is again inhibited. To this end, the output of the filter network 40 is applied to a dropout detector 52, the output of which is connected to inhibit the output of the buffer 46.

Figure 2A:
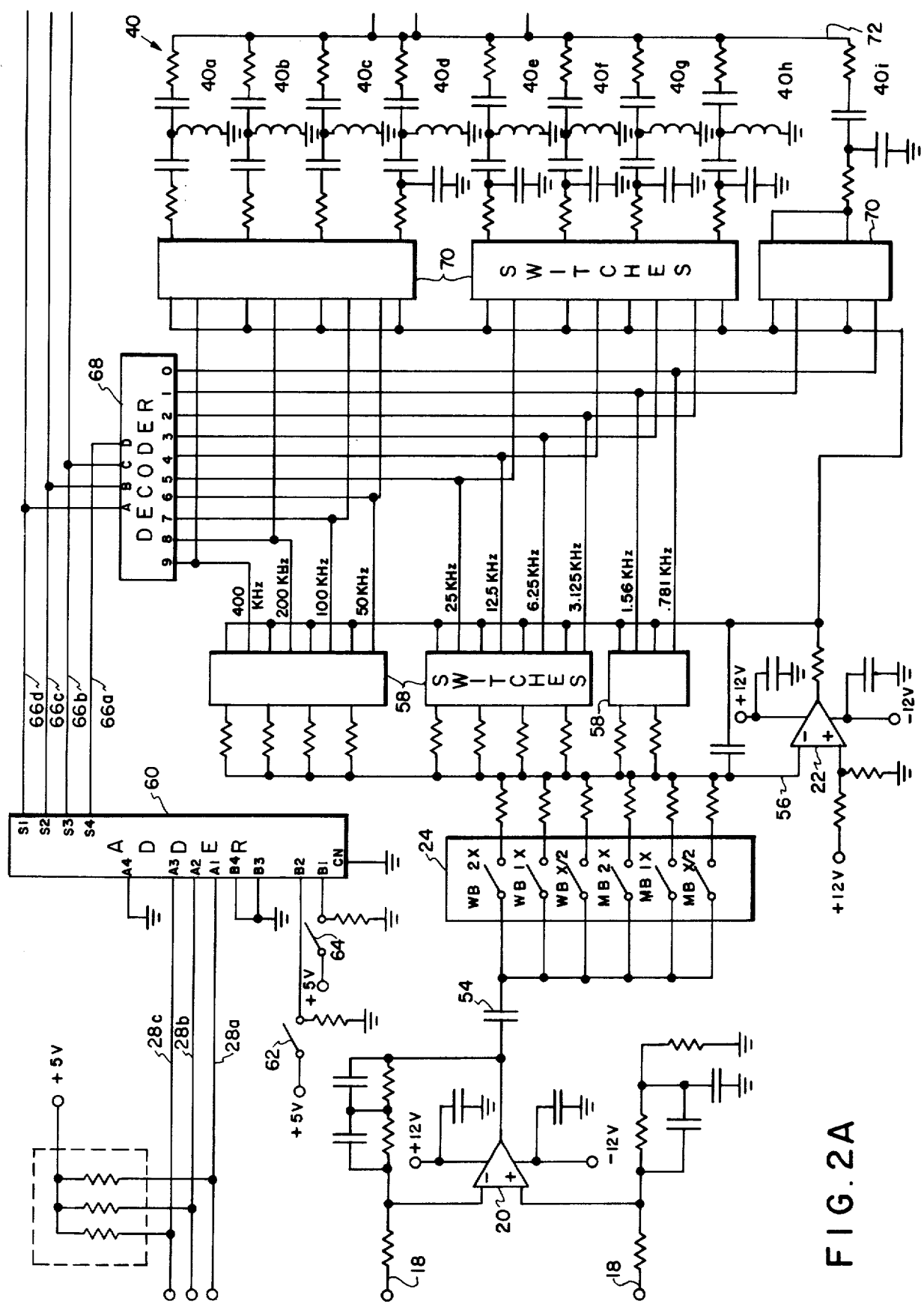
Figure 2B:
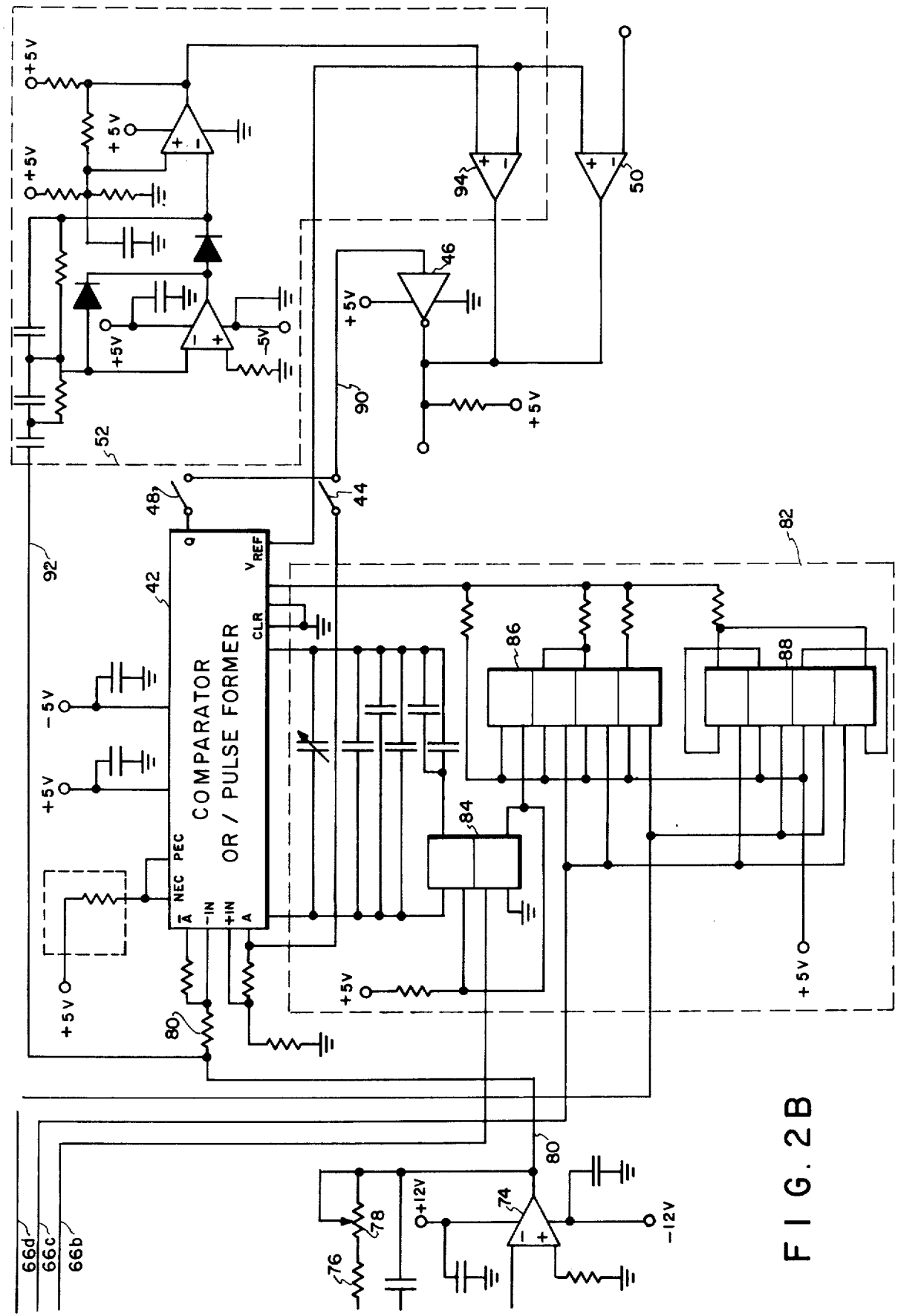

FIGS. 2A and 2B combined as shown in FIG. 2 show a detailed structure for the implementation of the apparatus shown in block form in FIG. 1. The input leads 18 from the control console 14 are applied, differentially, through appropriate impedance network to the two input terminals on the input buffer amplifier 20. The output of the buffer amplifier 20 is an alternating signal, substantially sine wave in form, of a frequency determined by the servo signal recorded on the tape. That output signal from the buffer amplifier 20 is coupled through a capacitor 54 to a common input for the switch bank 24.

The switches of the switch banks 24 are manually set by the operator to conform to the mode of operation of the tape system. Thus, the upper three switches, as illustrated in FIG. 2A relate to the wide band mode of operation while the lower three switches relate to the medium band mode of operation. The three switches in each group, relate respectively, to the characteristic operation relative to the predetermined standards, i.e., 2X, 1X or X/2. At any given time, only one of the switches in the switch bank 24 should be closed. Each of the switches is connected respectively through an associated resistor to an input bus, or summing junction 56, for the normalizer, or gain equalizer, operational amplifier 22. The resistors associated with the respective switches 24 differ in value, with respect to each other, in accordance with the characteristic of the input signal.

A feedback circuit is connected from the output of the amplifier 22 to the input bus or summing junction 56. That feedback circuit includes a plurality of resistors, each connected to the bus 56 at one end and connected through a signal controlled switch means 58 to the output of the amplifier 22. The switch means 58 is a plurality of solid state switch elements which, in an exemplary embodiment constructed in accordance with the present invention, comprise analog switch modules identified as MC14016 produced by Motorola. In these modules there are four switch elements in each module; each operates as an independent analog switch and each is independently actuated by an electrical signal applied to an associated control electrode. Thus, in the illustration shown in FIG. 2A, there are four feedback resistors connected to the upper module and four corresponding leads connected to a common lead connected to the output of the amplifier 22. Similarly, the second module has four individual feedback resistors connected to four terminals thereof and four corresponding leads connected to the common lead. The lower module shown in FIG. 2A has two feedback resistors connected to corresponding leads and two related connections to the feedback common lead. This module represents one-half of one of the above noted modules.

The control signals for the selective actuation of the switch elements in the switch module 58 are derived from the binary coded speed indicating signals appearing on leads 28a, 28b and 28c. The signals appearing on the leads 28a, 28b and 28c are applied as the augend to a solid state adder circuit module 60. The adder module may, as in the exemplary embodiment, be a module identifed as MC14560B distributed by Motorola. An addend is supplied to the adder 60 through a first digit switch 62 and a second digit switch 64. When the system is being operated in a 2X mode, the switch 62 will be manually closed while the switch 64 remains open. On the other hand, if the system is operated in a 1X mode, the switch 64 will be closed and the switch 62 remains open. When the system is operated in the X/2 mode, both of switches 62 and 64 remain opened. The closure of either of the switches 62 or 64 places a logical "1" at the corresponding input terminal of the adder 60.

The output of the adder 60 is in the form of a 4 bit binary coded decimal signal appearing on the four output leads 66a, 66b, 66c, 66d. Those output leads 66a, 66b, 66c and 66d are connected as input leads to a decoder module 68. In the aforementioned embodiment, the decoder module is a module identified as MC14028B distributed by Motorola. The decoder module will provide an output signal on one-out-of-ten output lines depending upon the coded signal appearing upon the lines 66a, 66b, 66c and 66d. The ten output lines from the decoder 68 are applied, respectively, to ten corresponding control signal input terminals of the switch modules 58. Each of the ten output leads from the decoder 58 represents one of the standard frequency signals hereinbefore mentioned. The ten output leads each representing a different frequency which differ from each other sequentially by a factor of two, accommodate the eight different speeds of the tape which may be selected as well as accommodating the 2X mode of operation and the X/2 mode of operation. This relationship is shown in Table 2, as follows:

| SPEED IPS | AUGEND (SPEED COOL) 4-2-1 | AD-DEND 2X | ADDER OUT-PUT | FREQ. CONTROL | APEND 1X | ADDER OUT-PUT | FREQ. CONTROL | ADDEND X Σ | ADDER OUT-PUT | FREQ. CONTROL |
|---|---|---|---|---|---|---|---|---|---|---|
| 120 | 111 | 0010 | 1001 | 400 KH₂ | 0001 | 1000 | 200 KH₂ | 0000 | 0111 | 100 KH₂ |
| 60 | 110 | 0010 | 1000 | 200 | 0001 | 0111 | 100 | 0000 | 0110 | 50 |
| 30 | 101 | 0010 | 0111 | 100 | 0001 | 0110 | 50 | 0000 | 0101 | 25 |
| 15 | 100 | 0010 | 0110 | 50 | 0001 | 0101 | 25 | 0000 | 0100 | 12.5 |
| 7.5 | 011 | 0010 | 0101 | 25 | 0001 | 0100 | 12.5 | 0000 | 0011 | 6.25 |
| 3.75 | 010 | 0010 | 0100 | 12.5 | 0001 | 0011 | 6.25 | 0000 | 0010 | 3.125 |
| 1.87 | 001 | 0010 | 0011 | 6.25 | 0001 | 0010 | 3.125 | 0000 | 0001 | 1.66 |
| .937 | 000 | 0010 | 0010 | 3.125 | 0001 | 0001 | 1.56 | 0000 | 0000 | .781 |

With one of the ten control leads to the switch module activated, a selected one of the ten switches will be closed. It should be clear that the signal appearing at the control leads is a steady state output signal level. It is not an oscillatory signal of the indicated frequency; it merely represents that frequency in the actuation of the selected switch. The selected switch closes a feedback path around the amplifier 22 which includes a resistor of such value as to respond to the position of the selected frequency signal on the frequency response curve of the head and, in cooperation with the selected input resistor, provide a gain characteristic of the amplifier 22 such that the output signal is a nominal one volt RMS signal irrespective of the position on a response curve of the selected transducer for the selected frequency signal. Thus, the output signal from the amplifier 22 is a signal of the selected frequency corresponding to the standards established for the selected tape speed which signal has a nominal one volt RMS level.

The output signal from the amplifier 22 is applied simultaneously to ten input terminals of a second signal control switching means 70. The switching means 70 is substantially identical to the switching means 58 and, in the exemplary embodiment, were also integrated circuit modules identified as MC14016 distributed by Motorola. The ten output leads from the decoder 68 were also applied, respectively, to the corresponding control input terminals of the switching modules 70. A plurality of filters 40 are connected, respectively, to the output terminals of the switch elements of the module 70. The filters are tuned, respectively, to the particular frequency of the input signal with which they are associated. Thus, the upper filter 40a is tuned to pass the 400 kilohertz signal when the appropriate switch of the switching means 70 is closed by a signal from the decoder 68. Similarly, the filter 40b is tuned to pass the 200 kilohertz signal, and so on through the filter 40h. The filter 40i is tuned to pass the signals at a frequency of 1.56 kilohertz or 0.781 kilohertz. Included in each of the filter units is a resistor which connects the filter to a common lead 72. These resistors comprise input summing resistors for an operational amplifier 74.

Amplifier 74 has a feedback impedance which includes a resistor 76 and a variable resistor 78 connected in series between the output of the amplifier and the common lead 72, or the input terminal, of the amplifier 74. The adjustable resistor 78 in the feedback around the operational amplifier 74 allows the output of the amplifier 74 to be adjusted to one volt RMS. Thus, the output of the amplifier 74 is a one volt RMS signal of substantially sine wave shape and of a filtered frequency determined by the speed of the tape and the mode of operation.

That signal is applied, through a resistor 80, to an input terminal of a comparator/pulse former 42. In practice, as in the exemplary embodiment hereinbefore referred to, the comparator/pulse former 42 may be in the form of an integrated circuit module identified as N8T20B distributed by Signetics. The module 42 comprises, in effect, a comparator which detects the zero crossing point of the applied input signal and produces a square wave output signal at the "A" terminal thereof. The comparator changes state each time there is a zero crossing. Thus, the symmetry of the square wave pulse is a function of the symmetry of the applied sine wave. The generated square wave pulse is also applied within the module 42 to a one-shot multivibrator. The one-shot is characterized in that the pulse duration may be controlled from means external to the module 42. Also the one-shot may be controlled from means external to the module 42 to produce an output pulse on the negative edge of the square wave, the positive edge of the square wave, or both. The output of the one-shot is taken at the "Q" output terminal of the module 42. In order to effect a one-shot output pulse occurring on both the negative and the positive edge of the square wave signal, a positive bias or logical "one" is applied to "NEC" and "PEC" terminals of the module 42. An impedance network 82 is connected to the module 42 to selectively control the pulse width of the one-shot output at the "Q" terminal of the module 42. With the one-shot being controlled to produce an output pulse on both the positive and negative edge of the square wave signal, the output signal at the "Q" terminal of the module 42 will be twice the frequency of the input signal or of the square wave signal at the "A" output terminal of the module 42. The impedance network 82 includes a plurality of signal control switch means for selectively controlling the pulse width in accordance with the three least significant bits of the output of the adder 60. Those signals applied over the leads 66b, 66c and 66d are applied, in accordance with predetermined logic, to the control input terminals of three switching modules 84, 86 and 88. Again these switching modules may be of the type identified as MC14016. The speed signals represented by the coded information on the leads 66b, 66c, and 66d are, of course, correlated with the frequency of the servo signal.

The switch 44 is connected between the "A" output terminal of the comparator 42 and an output lead 90. The switch 48 is connected between the "Q" output terminal of the module 42 and the lead 90. As was mentioned in connection with the description of FIG. 1, only one of these switches may be closed at any one time. When the switch 44 is closed, the output signal from the "A" terminal of the module 42 is applied to the input of an output buffer amplifier 46. The switch 44 is closed whenever the system is operated in the 1X or 2X mode. When the system is operated in the X/2 mode, the switch 44 is opened and the switch 48 is closed. In the X/2 mode, the signal applied to the input of the buffer amplifier 46 is the signal from the "Q" output terminal of the module 42 and is of a frequency twice that of the frequency of the signal input thereto. The output of the amplifier 46 is applied back to the control console to effect the servo control of the capstan driving motor 12.

The output signal from the amplifier 74 is also applied by a lead 92 to a drop-out detection circuit 52. The drop-out detection circuit 52 rectifies and filters the input signal applied thereto and compares the rectified signal with a reference signal. The result of that comparison is applied to one input terminal of an amplifier having an open collector output. When the signal applied to the input of the drop-out detector 52 is less than a predetermined level, the output of the amplifier 94 clamps the output of the output buffer amplifier 46 to ground, thereby inhibiting the output. The inhibiting of the output of the buffer amplifier 46, under these conditions prevents the system from attempting to control the speed of the tape from inadequate or irregular signals.

As was mentioned before, when the tape is being driven by the capstan at some speed other than the selected speed, as during start-up, the control console puts on a "squelch" signal which is applied to the "squelch" amplifier 50. The amplifier 50 also has an open collector output and, when energized, also clamps the output of the amplifier 46 to ground thereby preventing the servo system from being adversely affected by an incorrect frequency signal. Whenever the output of the amplifier 46 is clamped to ground, the tape speed control apparatus is operated under the control of the internally generated signal in the control console.

Thus, there has been provided, in accordance with the present invention, an improved circuit for conditioning a servo signal for controlling the speed of a magnetic record, the signal being obtained from the record wherein the need for flattening the natural frequency response curve of the transducer is eliminated and wherein the several frequency sensitive elements of the signal conditioning circuit are automatically programmed in response to the initial speed selection.

The embodiments of the invention in which an exclusive property or privilege is claimed are defined as follows:

1. A signal conditioning circuit means for servo signals magnetically recorded on a magnetic tape wherein reproduced signals of different frequencies correspond with correlated selectively different speeds of operation of said tape, said signal conditioning circuit means comprising:
    means for establishing a speed selection digital code signal,
    means responsive to said recorded signals to produce an analog sine wave signal of a frequency commensurate with said recorded signal, normalizing circuit means connected to receive said analog signal and responsive to said digital code signal to normalize said analog signals to a predetermined voltage level, selective filter means connected to receive said normalized analog signals and responsive to said digital code signal to be selectively responsive to pass a particular frequency of said analog signals, comparator means responsive to the filtered signals to produce a square wave pulse train of a frequency determined by said frequency of said filtered analog signal, and means responsive to said square wave pulse train for controlling the speed of operation of said tape.

2. A signal conditioning circuit means for servo signals magnetically recorded on a magnetic tape wherein reproduced signals of different frequencies correspond with correlated selectively different speeds of operation of said tape, said signal conditioning circuit means comprising:

means responsive to speed selection means for establishing a speed selection representative digital code signal, means responsive to said recorded signals to produce an analog sine wave signal of a frequency commensurate with said recorded signals and the selected speed, normalizing circuit means connected to receive said analog signals and responsive to said digital code signal to normalize said analog signal to a predetermined voltage level, selective filter means connected to receive said normalized analog signals and responsive to said digital code signal to be selectively responsive to pass a particular frequency of said analog signals, and comparator means responsive to the filtered signals to produce a square wave pulse train of a frequency determined by said frequency of said filtered analog signals.

3. A signal conditioning circuit means as set forth in claim 2 wherein the system associated with said tape may be operated in any of several modes, and wherein said normalizing circuit means comprises an operational amplifier having an input impedance which is a function of the mode of operation of said system and a feedback means the impedance of which is a function of said speed selection representative digital code signal.

4. A signal conditioning circuit means as set forth in claim 3 wherein said means for establishing said speed selection representative digital code includes means responsive to a digitally coded speed representative signal and to a digital representations of certain of said modes of operation to produce an output coded signal which is a composite of digitally coded speed signal and said digital representation of said mode.

5. A signal conditioning circuit means as set forth in claim 4 wherein said means for establishing said speed selection representative digital code includes a digital adder module the augend of which is said digitally coded speed representative signals and the addend of which is said digital representation of said mode of operation.

6. A signal conditioning circuit means as set forth in claim 2 wherein said feedback means includes a plurality of impedance elements and signal responsive switch means operable to connect a selected one of said impedance elements in feedback relation to said operational amplifier, said switch means being responsive to said speed selection representative digital code signal to effect the selection of said feedback impedance element.

7. A signal conditioning circuit means as set forth in claim 2 wherein said selective filter means comprises a plurality individual filter networks each tuned to a different one of the frequencies of said analog sine wave signal, and signal responsive switch means operable to connect a selected one of said filter networks in operative relationship in said circuit means, said switch means being responsive to said speed selection representative digital code signal to effect the selection of said filter network.

8. A signal conditioning circuit as set forth in claim 7 wherein each of said filter networks include an output resistor connected to a common lead, said filter means including an output operational amplifier having an adjustable feedback resistor connected to said common lead, said common lead comprising a summing junction connected to the input of said operational amplifier.

9. A signal conditioning circuit means as set forth in claim 2 wherein said comparator comprises means for producing a first square wave signal having a frequency equal to said frequency of said filtered analog signal, and a second square wave signal having a frequency double the frequency of said filtered analog signal, and switch means for selectively connecting one of said square wave pulses to an output circuit.

10. In a magnetic record reproducing system adapted to be operated at a selected one of a plurality of tape speeds including means for selecting the speed of the tape, a signal conditioning circuit means for tape speed servo signals reproduced from signals magnetically recorded on a magnetic tape wherein reproduced servo signals of different speeds of operation of said tape, said signal conditioning circuit means comprising:

means responsive to said speed selecting means for producing speed selection representative digital code signals, means responsive to said servo signals to produce an analog sine wave signal of a frequency determined by the recorded signal and the selected speed, normalizing circuit means connected to receive said analog signal and to normalize said analog signal to a predetermined voltage level, said normalizing circuit means including a plurality of selectively effective impedance elements and means responsive to said speed selection representative digital code signals to program the selection of said impedance elements, selective filter means including a plurality of filter networks, each tuned to a different one of the frequencies of said analog signal, connected to receive said normalized analog signals, said filter means including means responsive to said speed selection representative digital code signals to program the selection of a single one of said filter networks for operative connection to said normalizing circuit means; and comparator means responsive to the filtered signals to produce a square wave pulse train of a frequency determined by said selected frequency of said analog signals.

11. The signal conditioning circuit means as set forth in claim 10 wherein said normalizing circuit means includes a plurality of signal responsive switch means associated, respectively, with said plurality of impedance elements, and said means responsive to said speed selection representative digital code signal includes a decoder means selectively responsive to said code signals to produce a control signal on a selected one of a plurality of output leads, said leads being connected, respectively to control said plurality of switch means.

12. The signal conditioning circuit means as set forth in claim 11 wherein said selective filter means includes a plurality of signal responsive switch means associated, respectively, with said plurality of filter networks, said output leads of said decoder means being further connected to control said plurality of switch means in said selective filter means.

* * * * *